United States Patent [19]

Monaco

[11] 3,967,585
[45] July 6, 1976

[54] LARVAE COLLECTION SYSTEM
[75] Inventor: George Monaco, Los Altos, Calif.
[73] Assignee: Syntex (U.S.A.) Inc., Palo Alto, Calif.
[22] Filed: Apr. 2, 1975
[21] Appl. No.: 564,237

[52] U.S. Cl. .................................................. 119/2
[51] Int. Cl.² ........................................ A01K 61/00
[58] Field of Search ............... 119/2, 3, 4, 5; 209/83

[56] References Cited
UNITED STATES PATENTS

| | | | |
|---|---|---|---|
| 757,407 | 4/1904 | Mayhall | 119/5 |
| 1,528,179 | 3/1925 | Baldridge | 119/3 |
| 3,658,034 | 4/1972 | Day et al. | 119/4 |
| 3,696,788 | 10/1972 | Day et al. | 119/2 |

*Primary Examiner*—Hugh R. Chamblee
*Attorney, Agent, or Firm*—Tom M. Moran; William B. Walker

[57] ABSTRACT

This invention is a small, aquatic animal-collecting device which comprises a container for water being open at one end and closed at the other; a fluid inlet means to said container; a fluid conduit means positioned within and extending about the vertical length of the container and passing through the bottom of the container; a fluid outlet means positioned in the upper portion of the conduit; and a screening means positioned between the side walls of the container and the fluid outlet means so that the animals are retained in the container in sufficient water, while excess water passes through the screen and out the outlet means. This apparatus is particularly well suited for the process of collecting prawn larvae from a closed-loop aquaculture system.

16 Claims, 6 Drawing Figures

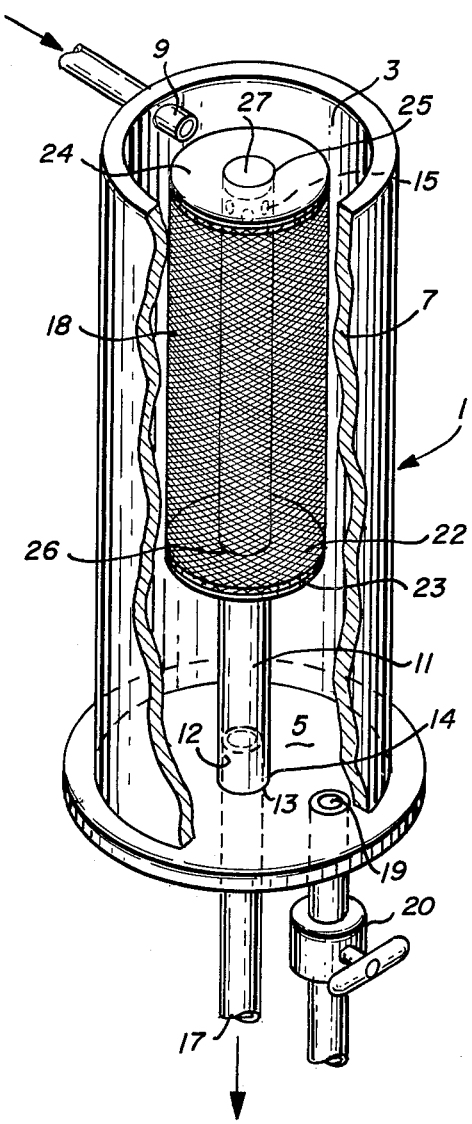
Fig_1
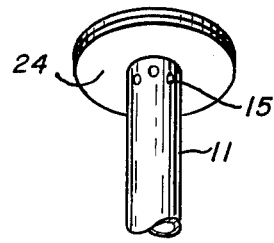
Fig_1a
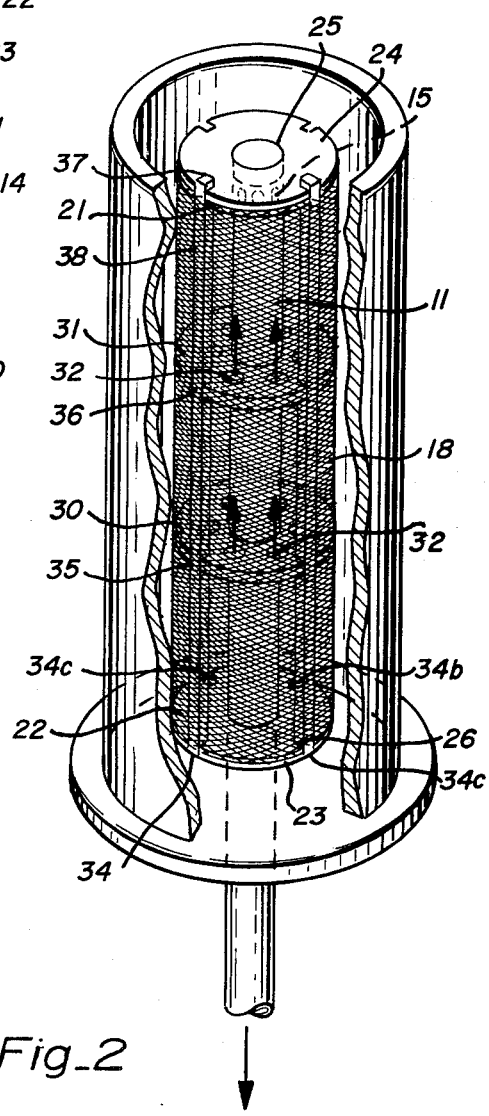
Fig_2

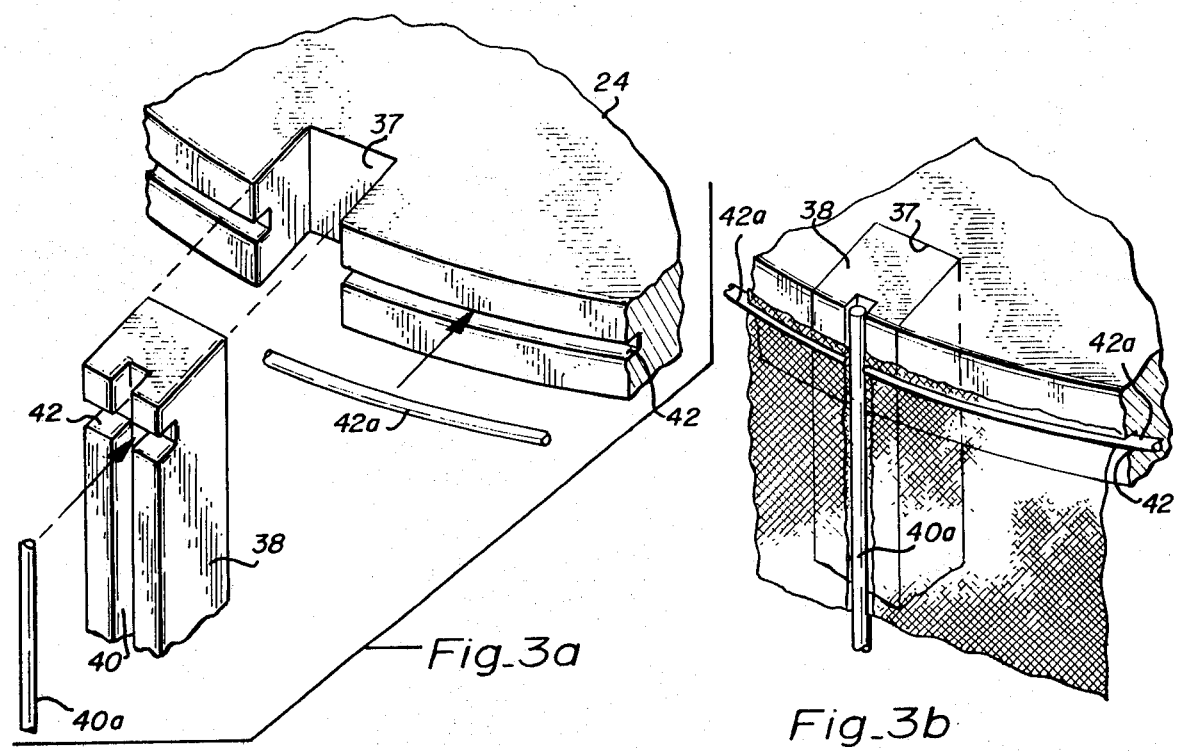
Fig_3a
Fig_3b
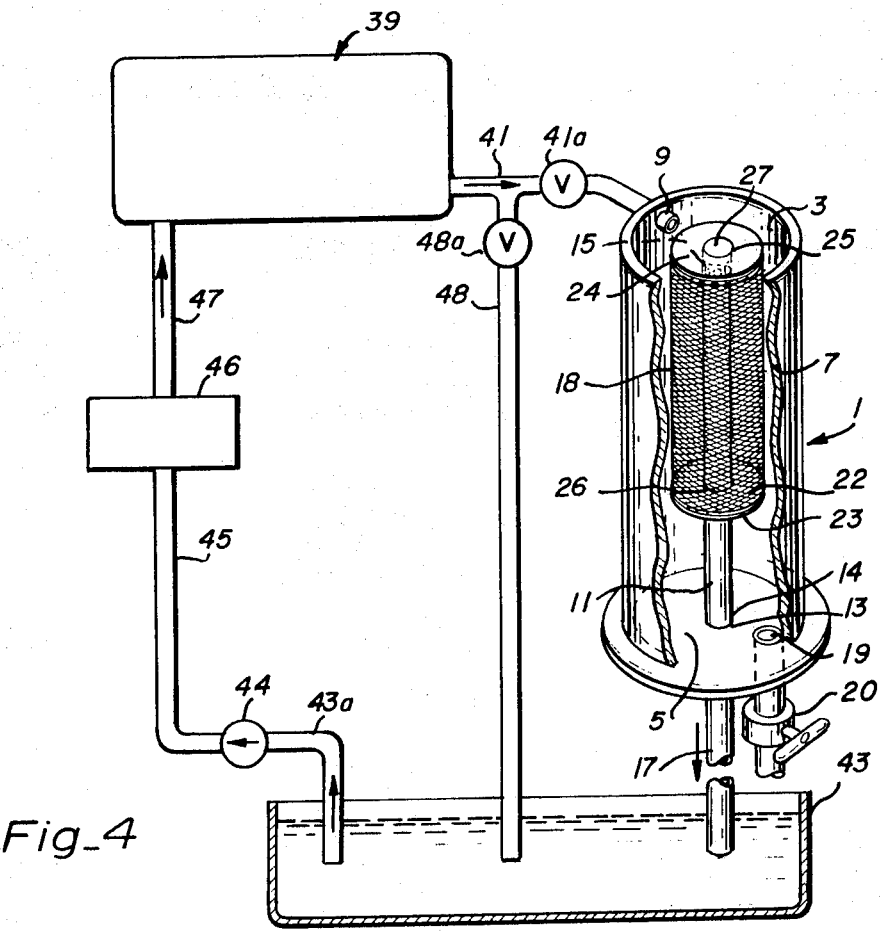
Fig_4

_

LARVAE COLLECTION SYSTEM

FIELD OF THE INVENTION

This invention relates to an improved apparatus and method for collecting small aquatic animals in large quantities from a closed-loop aquaculture system in which they are growing.

DESCRIPTION OF THE PRIOR ART

Closed-loop aquaculture systems offer many advantages over open systems; these advantages have been discussed in U.S. patent application Ser. No. 512,384. In rearing aquatic animals in a closed-loop system, especially *Macrobrachium - rosenbergii*, where eggs are hatched in an aquaculture tank and the larvae free swimming, it is imperative to eliminate the possibility of loosing the larvae to the recirculation system. Should the larvae be allowed to enter the filtration system they would be killed or damaged thus describing the useful intent of the closed-loop system. In order to prevent loss of the larvae, a filtering means is generally placed over the outlet from the tank in which the eggs are hatching to keep the larvae in the tank. Upon completion of the egg hatching process, the larvae must be removed from the hatching tank and transferred into an environmental system suitable for larvae culture. In the past, larvae have been collected from the hatching tank by first removing the parental female then the larvae. Larvae were removed by syphoning out the water from the hatching tank along with the larvae into a container for transport to the culturing system via acclimatization. Then the hatching tank must be re-filled before it can again be reused. This procedure is time consumming, inefficient and economically burdensome.

I have now discovered an apparatus and process which substantially improves as well as simplifies the process of collecting small aquatic animals, such as prawn larvae, for transfer into a culturing system. My invention offers the advantages that the apparatus can merely be hooked into the circulating system on which the hatching tank or tanks are placed and the larvae will automatically be collected in the apparatus. The apparatus is capable of handling simultaneously, larvae of several hatching tanks by simple plumbing modifications. Another advantage attributed to this device is it enables a culturist to collect larvae as the eggs hatch. The hatching process may take as long as 24 hours at which time the first larvae produced from the hatching eggs (partial hatch) can be collected (removed) from the hatching tank automatically without disturbing the parental animal and jeopardizing the remaining unhatched eggs. Should a larval hatch occur in the early morning hours (with *Macrobrachium - rosenbergii* all hatches occur at evening or early morning hours when no attendant is on duty) the culturist would find upon his arrival to work, all the larvae nicely collected and ready for acclimatization. With this process neither the parental animal nor the larvae are needlessly distrubed or endangered. The apparatus is cleaned easily, the parts are readily replaceable, there are no moving parts to break down and the process is easily adaptable to any closed-loop aquaculture system. Further, the apparatus is designed to have the same flow rate and the same water as the system from which the larvae originally came and thus there is no shock to the larvae as they are collected.

SUMMARY OF THE INVENTION

The apparatus of this invention is a small, aquatic animal-collecting apparatus which comprises
 a container suitable for retaining water being open at one end and closed at the other;
 a fluid inlet means to said container;
 a fluid conduit positioned within and extending about the length of the container and passing through a lower portion of the container;
 a fluid outlet means positioned in the upper portion of said conduit; and
 a screening means, preferably of a particular design recited hereafter, between the side walls of the container and the fluid outlet means so that the small animals are retained in the container in a life sustaining amount of water, while excess water is allowed to pass through the screening device and out the outlet means. Preferably the apparatus also includes a valved fluid outlet means positioned in the lower portion of the container so that the small aquatic animals and the life sustaining amount of water may be drained from said container. Other preferred embodiments of the apparatus invention will be discussed hereinafter.

Another aspect of the invention is the process for collecting small aquatic animals utilizing the apparatus of this invention.

BRIEF DESCRIPTION OF THE DRAWINGS

FIG. 1 is a partial cutaway perspective of the apparatus of this invention.

FIG. 1a is the underside view of disc 24, part of the screening device.

FIG. 2 is a partial cutaway perspective of certain preferred embodiments of this invention.

FIG. 3a is a closeup, exploded perspective of a preferred aspect of the fastening means of the screening device used in the apparatus of this invention.

FIG. 3b is a closeup perspective of the fastening means of the screening device used in the apparatus of this invention.

FIG. 4 is a diagrammatical representation of the system in which the apparatus of this invention is particularly useful.

PREFERRED EMBODIMENTS

Turning to FIG. 1 a partial cutaway perspective of the apparatus of this invention is seen. The aquatic animals along with a life sustaining amount of water is collected in container 1 which is open at the upper end 3 while being closed at the opposite end by bottom wall 5, thus forming a container which is suitable for retaining water. The size of the container may be varied to suit the needs of the user and may be any reasonable size from a pint to several gallons. The shape of the container may be any usual cross-sectional shape such as a square, a rectangle, or other polygon, an oval or preferably is circular as shown in FIG. 1 which shows the container as a cylinder, the vertical walls of the cylinder being indicated as 7. The container may be constructed of any suitable non-toxic material such as wood or metal, but is preferably polypropylene or polyethylene. A fluid inlet means 9 passes through wall 7 of the container, the inlet being large enough to allow the water and small animals such as larvae of the system or systems from which the larvae are being collected to pass into the container. Although the fluid inlet means is shown as passing through the container it may enter the container through the open end of the container and need not be actually attached through the wall of the container. Further there may be a plurality of fluid inlet means if several systems are being treated at the same time.

A fluid conduit 11 is provided to allow liquid to pass through the lower portion of the container through aperture 13. The outer wall 14 of the conduit may be in a substantially water-tight relation to the container at aperture 13 so that water will not leak out. Generally the conduit is removable and may be screwed into the lower portion of the container or may be in close frictional contact with the walls defining the aperture through which the conduit passes. Preferably, however, the aperture 13 will have extension sleeve 12 firmly fastened (e.g. by welding) extending upwards from bottom wall 5 over which conduit 11 tightly fits, either frictionally or by screwing on. After the water in the container reaches the level of the fluid outlet means 15 in the conduit, the water passes through the apertures 15 of the outlet means in the upper portion of conduit near the top of the container. The water passes down the fluid conduit 11 and out the other end 17 of the conduit then to the rest of the system.

A screening means generally indicated as 18 prevents the small aquatic animals from going through the fluid outlet means 15 and getting into the water purification portion of the closed-loop system. The screening means must be of large enough surface area so that it is not plugged by debris. Preferably in the bottom wall 5 of the container another fluid outlet 19 is located through which the liquid in the container along with the small aquatic animals are drained when they are removed from the system. This outlet is closed by means of valve 20, thus retaining the water and the small aquatic animals during the time that the animals are being collected, but allowing the contents of the container to be drained when desired.

The screening device in FIG. 1 is generally shown as comprising a lower plate 22 (the first plate) through which the conduit 11 passed and to which the conduit is sealingly and securely attached via the aperture 26. The other end of the conduit which has the fluid outlet apertures is securely attached to the second plate and preferably passes through the second plate through aperture 25. The conduit is preferably open at 27. This opening under normal conditions is located above the level of the liquid normally retained in the container. The presence of opening 27 prevents an air lock from forming, allows surging or slashing water to escape readily, and if the container does fill-up, for example if the screening means is clogged, the water can flow down through the conduit and prevent overflowing of the container into the work area. The plates 22 and 24 are indicated as being substantially circular, however, these, too, may have other shapes such as a square, rectangular or other polygonal shapes. Preferably, the plates are circular discs. To minimize the strain of the screen 18 placed around the discs, the outer edges of the plates are located equal distance from the outer wall of conduit 11.

Enclosing the conduit 11 and the fluid outlet apertures 15 and being securely fastened to lower plate 22 around the plate's circumference at 23 is a water-permeable material. This material is generally a flexible, non-toxic, reticulated material having small mesh openings which allow the water in the system to pass through but which retains the small aquatic animals on the outside of the material and in the container. Particularly useful for this is a nylon screen having a mesh size of about 20 microns or more, depending on the size of the aquatic animals. The flexible material may be of cylindrical shape closed on one end which fits over plate 24 and opening 27 and is attached snugly to plate 22. In such a case the material need only be fastened securely around the circumference 23 of plate 22. The flexible, reticulated material may be cylindrical in shape being open at both ends and thus would be snugly attached around the circumferences of both plates 22 and 24.

The size of the screening device may be any reasonable size, and may vary e.g. from 2 inches to over a foot in length and an inch to about 6 inches or more in diameter. As the length between discs 22 and 24 of the screening device shown in FIG. 1 is increased structural problems become apparent thus various support means must be utilized in order to prevent the screen from collapsing and tearing.

FIGS. 2, 3a and 3b show several particularly preferred aspects of screening device of the apparatus of the invention.

In FIG. 2 the same numerals are indicative of the same parts as in FIG. 1. Here again the device has conduit 11 passing through plate 22 via aperture 26 and going through plate 24 at aperture 25. Conduit has fluid outlet apertures 15 while water permeable material 18 encloses the conduit and is attached securely to plates 22 and 24 around their peripheries at 23 and 21. Depending on the length of the distance between plates 22 and 24 at least one other plate is generally required for sufficient support of the water permeable material 18. In FIG. 2, two additional plates 30 and 31 are utilized. These plates are supplied with apertures 32 located around the outer portions of the surface of the plates for reasons which will be described hereinbelow. Plate 22 has notches 34, 34a, 34b and 34c around the periphery of the plate. Similarly plates 30, 31 and 24 have notches at 35, 36 and 37, respectively corresponding to notch 34 on plate 22 and other notches corresponding to 34a, 34b and 34c on plate 22. At least one longitudinal support bar 38 which extends longitudinally and coaxially with conduit 11 is used to support and space apart plates 22, 24, 30 and 31 as well as support the permeable sheet 28. In FIG. 2, four longitudinal bars are employed, generally one of which is removable. The size and shape of each of the corresponding notches, for example 34, 35, 36 and 37 are designed to accept and retain the support bar 38 to form a firm undersupport for the water permeable material 18. Preferably the water permeable material is a flexible, non-toxic, reticular material such as woven or knitted nylon in the form of a substantially rectangular sheet which is wrapped about the periphery of plates 22, 30, 31 and 24 and is overlapped at longitudinal bar 38. NITEX, a nylon monofilament bolting cloth, has been found to be particularly valuable for this purpose.

Because tubular nylon material is difficult to obtain, it is a particularly important aspect of this invention that the unique way of fastening may be used for readily obtainable nylon sheets as shown in FIGS. 3a and 3b. Once bar 38 is snugly established into the corresponding notches 34, 35, 36 and 37 on respective plates 22, 30, 31 and 24 a groove 40 which extends longitudinally the length of the bar 38 is used to attach the nylon sheet. The sheet edges are overlapped at bar 38 and are forced into the longitudinally extending groove by inserting an elongated fastening member 40a snugly into the groove. This secures the nylon sheet within the groove and encloses the conduit.

To further securely fasten the nylon sheet around the conduit, the sheet is further forced into grooves that run circumferentially around the edges of plates 22 and 24. The screen is attached by forcing a flexible attaching means into the groove thus forcing the nylon sheets into each groove and securing the sheet in the grooves. The fastening means may be a nylong thread, which may be wrapped around the circumference of plates 22 and 24 as many times as needed, then tied. Or, the fastening means may be a polyethylene welding spleen or the like.

A further elaboration of the particularly preferred aspect of the fastening means of this invention is shown in FIGS. 3a and 3b, a view of top plate 24. Bar 38 fits snugly into notch 37, the notch corresponding to those on the other plates. It should be noted that the vertical fastening bar 38 is grooved both longitudinally and transversely in order to accommodate both flexible fasteners 40a and 42a. Once the longitudinal bar 38 is snugly fit into notch 37, the nylon screen cloth 28 is positioned so that the edges overlap at the vertical fastening bar 38. Fastening member 40a is forced into groove 40 extending along bar 38 longitudinally to snugly engage and hold the nylon screen cloth 28 in position. By this means one can readily fasten the cloth and remove it when desired. Once the nylon cloth is attached to vertical fastening bar 38, a flexible fastener is forced into circumferentially located groove 42 so that the nylon cloth 18 is forced into the groove and snugly held there by the cord fastener 42a. Generally, the cord fastener will be a nylon thread or a 3/16 polyethylene welding spleen, although it may be any other similarly suitable means.

Referring again to FIG. 2, the reason for apertures 32 through plates 30 and 31 is now explained. As the water from the container goes through water outlet means 15 located in the conduit the flow through the screen is primarily at the surface of the water. If the holes in discs 30 and 31 were not present the flow would be limited to a small area of the screen. This could result in a velocity suction occurring and drawing the small aquatic animals not strong enough to fight the currents to clump on the screen near or at the surface of the water. This, in turn, could result in the death of many of the animals and decrease the production of the system. The presence of perforations 32 allow the water to flow through the perforations as indicated by the arrows thus preventing a velocity suction from occurring. This also prevents the animals from collecting on the screen to any significant extent.

Turning now to FIG. 4, the apparatus of this invention is shown as part of a system for collecting small, aquatic animals such as prawn larvae e.g. *Macrobrachium - Rosenbergii*. The adult prawn is held in container 39 with a life sustaining amount of water. In this container the eggs hatch and the larvae swim throughout the water in the container. Prior to the existance of the larvae, the water is circulated, generally from the container 39 through lines 41 and 48 to a sump 43 for holding purposes. Although FIG. 4 shows only one tank 39, it is understood that a plurality of tanks may be employed in the system and may be connected to the collecting device either individually or through a manifold.

The water is pumped from sump 43 through lines 43a and 45 via pump 44 to a filtering system 46 and then back to the container 39 for the prawn to use. The apparatus of this invention can be readily used in the overall system by attaching the water inlet means 9 to outlet line 41 and positioning the small aquatic animal collecting means 1 so that the outlet 17 empties into sump 43. Preferably collecting means 1 is attached to a movable cart so that it may be readily moved and positioned as desired. Water from tank 39 where the adult prawn as well as the larvae are contained drains via gravity flow through line 41 into the apparatus of this invention 1 where it is collected in the container. The water level in the container 1 will be maintained at a level which is the same as apertures 15. Valve 48a is closed to prevent the water from going directly into the sump without going through the aquatic animal collecting device 1. Pump 44 operates at its usual rate to draw water from the sump which is passed through the aquatic animal collecting device 1 at the same rate as the water being circulated to tank 39. Water is pumped through line 45 to the filtering device 46 which may include a biological filter, a toxic chemical filter and other filtering means as discussed in U.S. patent application Ser. No. 512,384. The treated water then returns to tank 39 vai line 47 to replenish the supply needed by the prawn and the larvae in tank 39. Generally no more than a period of about 24 hours is needed to collect all the larvae which may be found in container 39. Once the larvae are collected in container 1 via line 41 it is closed at valve 41a and the aquatic animal collecting device 1 is transferred to the culturing system for acclamitization of larvae and the life sustaining amount of water along with the aquatic animals are drained through line 19 then through valve 20 into that system.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or process, process step or steps, or then-present objective to the spirit of this invention without departing from its essential teachings.

Thus, another aspect of this invention is a process for collecting small, aquatic animals from a tank which comprises passing a life sustaining amount of water along with the aquatic animals into a container suitable for retaining water being open at one end and closed at the other, said container having (*i*) a fluid conduit positioned within and extending about the vertical length of said container and passing through at a lower portion of said container, (*ii*) a fluid outlet means positioned in the upper portion of said conduit, and (*iii*) a screening means positioned between the side walls of the container and said fluid outlet means and allowing excess water to pass through said screening device and out said outlet means while retaining said small aquatic animals in said container in a life sustaining amount of water. Preferably the water flowing out through said conduit is returned to the tank from which the aquatic animals were originally taken and the animals are *Macrobrachium - rosenbergii* larvae. The screening means used is preferably as described previously.

I claim as my invention:

1. A small, aquatic animal-collecting apparatus which comprises
a container suitable for retaining water being open at the upper end and closed at the other;
a fluid inlet means to said container;
a fluid conduit positioned within and extending about the vertical length of said container and passing through a lower portion of said container;
a fluid outlet means positioned in the upper portion of said conduit; and
a screening means positioned between the side walls of the container and said fluid outlet means so that said small aquatic animals are retained in said container in a life sustaining amount of water, while excess water is allowed to pass through said screening device and out said outlet means, said screening means comprising
a first plate;
a second plate parallel to, spaced from, and about the same size as said first plate;
said conduit passing through an apperture centrally located in said first plate, the end of said conduit being attached to a face of said second plate, the corresponding edges of said plates being the same distance from the outer wall of said conduit; and
a fluid permeable material extending between the edges of said plates and enclosing a portion of said conduit and said fluid outlet means positioned on the upper portion of said conduit by being snugly fitted at least around the periphery of said first plate.

2. The apparatus of claim 1 wherein a valved fluid outlet means is positioned in the lower portion of said container so that said small aquatic animals and said life-sustaining amount of water may be drained from said container.

3. The apparatus of claim 1 wherein said screening means is attached to said conduit but is spaced from said fluid outlet means and said conduit is removably attached to said container.

4. The apparatus of claim 1 wherein a groove extends circumferentially about the edge of said first plate and said fluid permeable material is flexible, reticulated, and attached to said first plate by a flexible fastening means engagingly fitted over said material and into said groove so that the material and said fastening means are engagingly located in said groove.

5. The apparatus of claim 4 wherein said fluid permeable material is a flexible, woven, reticulated nylon tube, said second plate is grooved similarly to said first plate, and said fluid permeable material is similarly attached snugly in said groove.

6. The apparatus of claim 4 wherein said first and second plates each have at least one notch correspondingly located at the respective edges of said plates and each plate has a groove extending around the circumferential edge, said apparatus further comprising
a solid support bar (i) extending between said plates in a coaxial relation to said conduit, (ii) fitting securely into said notches, and (iii) having a longitudinal groove extending the length of said support bar on a side of said bar facing away from said conduit and
wherein said permeable material is a substantially rectangular, flexible, reticular sheet the two opposite edges of which overlap along said longitudinal groove of said support bar and said sheet is attached by engagingly fitting said elongated fastening member over said sheet edges to securely retain said sheet edges in said longitudinal groove and
wherein the other edges of said reticular sheet are fastened to said plates by fitting a flexible member over said other edges and forcing them securely into said circumferential grooves of said plates.

7. The apparatus of claim 6 comprising in addition at least one centrally apertured plate (i) which is located between and spaced from said first and second plate (ii) through which said conduit passes, and to which said conduit is securely attached (iii) which is approximately the same size as said first and second plates. (iv) which as a series of small apertures spaced from said centrally located aperture, and (v) which has a notch corresponding to said notches on said first and second plates, said corresponding notch having said solid support bar secured therein; and
at least two additional support bars intersecting and supporting said plates, by fitting securely into corresponding notches located in said plates.

8. the apparatus of claim 7 wherein four support bars intersect said first and second plates and two additional centrally apertured plates also having apertures spaced from said central aperture.

9. The apparatus of claim 6 wherein said container, conduit, bars, and plates are made of polypropylene or polyethylene.

10. A process for collecting newly hatched, small aquatic animals from a hatching tank containing a parental female without removing said female from said hatching tank, which process comprises
passing a life sustaining amount of water along with said newly hatched, small, aquatic animals from said hatching tank into a container suitable for retaining water being open at one end and closed at the other, said container having (i) a fluid conduit positioned within and extending about the length of said container and passing through a lower portion of said container, (ii) a fluid outlet means positioned in the upper portion of said conduit, and (iii) a screening means positioned between side walls of the container and said fluid outlet means and
allowing excess water to pass through said screening device and out said outlet means while retaining said small aquatic animals in said container in a life sustaining amount of water while retaining said parental female in said hatching tank.

11. The process of claim 10 which comprises in addition returning the water flowing out through said conduit to the tank from which the aquatic animals were originally taken.

12. The process of claim 10 wherein after said aquatic animals are collected in said container the fluid and the aquatic animals are drained from said container and placed in a grow-out system.

13. The process of claim 10 wherein said small aquatic animals are *Macrobrachium - rosenbergii* larvae.

14. The process of claim 10 wherein said screening means comprises
a first plate;
a second plate parallel to, spaced from, and about the same size as said first plate;
said conduit passing through an aperture centrally located in said first plate, the end of said conduit being attached to a face of said second plate, the corresponding edges of said plates being the same distance from the outer wall of said conduit; and a fluid permeable sheet extending between the edges of said plates and enclosing a portion of said conduit and said fluid outlet means positioned on the upper portion of said conduit by being snugly fitted around the periphery of said first and second plates.

15. The process of claim 14 wherein a groove extends circumferentially about the edges of said first and second plates and said fluid permeable material is a flexible, reticulated nylon sheet of rectangular shape and is attached to said first and second plates by a flexible fastening means engagingly fitted over said sheet and into the grooves so that the sheet and said fastening means are engagingly located in the groove.

16. The process of claim 15 wherein the apparatus comprises in addition at least one centrally apertured plate (*i*) through which said conduit passes and to which said conduit is securely attached, (*ii*) which is approximately the same size as said first and second plates, (*iii*) which has a series of small apertures spaced from said centrally located aperture, each of said plates having at least 1 notch correspondingly located at the respective edges of said plates, at least one solid support bar (*i*) extending between said paltes in a coaxial relation to said conduit, (*ii*) fitting securely into said notches and (*iii*) having a longitudinal groove extending the length of the support bar on the side of the bar facing away from the conduit, an elongated fastening member which is about as long as the distance between said first and second plates and has a diameter such that it will snugly fit into said longitudinal groove on said support bar, wherein the two opposite edges of said nylon sheet overlap along said longitudinal groove of said support bar and said sheet is attached by engagingly fitting said elongated fastening member over said sheet edges to securely retain said sheet edges in said longitudinal groove and wherein the other edges of said reticular sheets are fastened to said first and second plates by fitting a flexible member over said other edges and forcing them securely into the circumferential grooves of said plates.

* * * * *